United States Patent Office 2,868,846
Patented Jan. 13, 1959

2,868,846

PREPARATION OF 2,2,2-TRIFLUOROETHANOL

Francis E. Lawlor, Wyndmoor, and Milton Braid and Bernard Loev, Philadelphia, Pa., assignors to Pennsalt Chemicals Corporation, a corporation of Pennsylvania No Drawing. Application January 5, 1956
Serial No. 557,432

17 Claims. (Cl. 260—633)

This invention relates to a novel process for the production of trifluoroethanol.

Trifluoroethanol has been previously prepared only indirectly from 1,1,1-trifluoro-2-chloroethane, or trifluoroethyl chloride. This prior process requires, first, heating the halide together with anhydrous potassium acetate in the absence of a solvent, or with anhydrous sodium acetate in a glacial acetic acid solvent, in a lead-lined pressure vessel at a temperature in the range of 200 to 250° C. for 40 to 50 hours at a pressure of 80 to 90 atmospheres; the product thus obtained is trifluoroethyl acetate, which is first isolated and then saponified to obtain trifluoroethanol. Henne, Alm and Smook (JACS, 70, 1968 (1948)) found the yield of ester in this process to be so sensitive to reaction conditions that they recommend instead, for manufacture of the alcohol, the reduction of trifluoroacetic acid ester or halide with lithium aluminum hydride.

Attempts to prepare the alcohol by aqueous hydrolysis of trifluoroethyl chloride, for example by heating the chloride in an aqueous solution of sodium oleate and sodium hydroxide, which is one of the conventional means of hydrolyzing alkyl halides to alcohols, proved completely unsuccessful. No detectable amount of alcohol was formed.

We have now found that trifluoroethanol may be made by heating trifluoroethyl chloride in a reaction medium that includes a hydroxylated solvent, as defined below, the reaction medium being maintained at a pH for the most part between 3 and 10, preferably between 4 and 7, for example by having dissolved therein a salt of a weak acid. To bring about reaction, the reaction mixture is heated, preferably at a temperature in the range of 175 to 300° C. and preferably under the autogenously developed pressure. Preferably an acid is also added initially to attain the preferred pH of 4 to 7 but, as will be noted, an initial mildly alkaline medium is operable. The yield of trifluoroethanol has been found to approach 100%. The unreacted trifluoroethyl chloride may be recycled and esters (if any) of the hydroxylated solvent may be saponified to obtain alkali metal salts and solvent, which may then be recycled. The term "pH" as used herein, means a pH determined by conventional means at room temperature on a withdrawn sample of reaction mixture to which about three volumes of water has been added if not already present.

The method of this invention provides a process for the production of trifluoroethanol, in which a shorter reaction time is required, saponification of trifluoroethyl ester is eliminated, solutions are utilized instead of solids, operating temperatures and pressure are lower, and unconverted reactants are recycled.

The hydroxylated solvent referred to above may be water or an alcohol that is reasonably stable against decomposition under the reaction conditions employed. The term alcohol is used herein to include all mono and polyhydric alcohols.

Advantageous monohydric alcohols include n-butanol, n-pentanol, branched-chain primary pentanols, normal and branched-chain hexanols, octanols and the like. Lower alcohols such as methanol and ethanol are less advantageous because of the high pressures that develop at the elevated temperatures employed and because they may decompose in the presence of a reactive buffer salt like sodium acetate.

Among the polyhydric alcohols which may be employed are ethylene glycol, propylene glycol, hexylene glycol, and the like, butane-2,3-diol, glycerine, or any other polyhydric alcohol which is stable under the reaction conditions employed.

The soluble salts of weak acids which may be employed as buffers to maintain the desired pH may be any salts which are at least partially soluble in the hydroxylated solvent employed. Preferably an alkali metal salt is used, but others, such as those of the alkaline earth metals (including magnesium), are also suitable. For example, these salts may be salts of organic or inorganic acids such as alkali metal salts of fatty acids, among which are sodium acetate, potassium acetate, sodium oleate, sodium caprylate, and sodium stearate. Among other salts of organic acids which may be employed are sodium formate and sodium benzoate. Salts of inorganic acids may also be employed, such as sodium carbonate and sodium phosphate. The salt need be soluble in the reaction mixture only to the extent of providing some small amount of dissolved salt under the reaction conditions employed. When an acid is added initially, it is preferably the acid corresponding to the above-described soluble salt, but another acid may be added, or an acid may be formed in situ. Thus, when an alkali metal acetate is employed as the alkali metal salt of a weak acid, the addition of an acid stronger than acetic will result in the formation of acetic acid, due to reaction of the strong acid with the alkali metal acetate. Conversely, since the hydrolysis reaction produces acid, caustic alkali such as sodium or potassium hydroxide may be introduced from time to time to maintain the desired pH. If a weak acid or a salt of a weak acid were initially present, the addition of the caustic alkali regenerates the buffer system. Examples of this mode of operation are shown in the runs of Example 3 below, where potassium hydroxide is added to recycled reaction medium to regenerate the buffer salt.

Examples of suitable buffering pairs are the following:

Sodium acetate—acetic acid
Potassium acetate—acetic acid
Magnesium acetate—acetic acid
Sodium oleate—oleic acid
Potassium oleate—oleic acid
Sodium stearate—stearic acid Sodium caprylate—caprylic acid
Sodium formate—formic acid
Sodium benzoate—benzoic acid
Sodium bicarbonate—carbon dioxide
Sodium dihydrogen phosphate—sodium hydrogen phosphate
Sodium phthalate—phthalic acid Other suitable buffering pairs would be obvious to those skilled in the art, for example, salts and acids of any of the aliphatic carboxylic acids, hydroxy acids such as hydroxy acetic and lactic acids, and aromatic acids such as toluic acid and naphthalene carboxylic acids. Advantageous acid-salt pairs are those which are least corrosive and are easily recoverable from the mother liquor, for example sodium benzoate-benzoic acid, sodium phthalate-phthalic acid, sodium acetate-acetic acid, and sodium oleate-oleic acid.

The process of the present invention may advantageously be conducted in a Monel metal or stainless steel autoclave.

The relative proportions of reactants is not important except that it is preferred to use an amount of the salt of the weak acid at least equivalent to the trifluoroethyl chloride, and sufficient of the hydroxylated solvent to make a solution or tractable slurry of the whole reaction mixture. Increasing the ratio of alkali metal salt to trifluoroethyl chloride appears to result in an increase in conversion and a high yield. For example, using potassium acetate as the alkali metal salt, and ethylene glycol as the polyhydric alcohol, it was observed that when the ratio of potassium acetate to trifluoroethyl chloride was increased by a factor of 1.5, while maintaining the concentration of potassium acetate with respect to ethylene glycol constant, an increase in conversion of 150 percent resulted. An optimum ratio is about 1.5 to 2 mols salt per mol trifluoroethyl chloride.

Similarly, the ratio of solvent to trifluoroethyl chloride has an important bearing on conversions and yield. Advantageous ratios may be in the range of from 1 to 30 mols of solvent per mol trifluoroethyl chloride. When water is the solvent, 5 to 10 mols per mol trifluoroethyl chloride appears to be optimum although excellent yields have been obtained with 20 or more mols water per mol trifluoroethyl chloride.

Although some reaction can be expected outside these ranges, practicably useful temperatures range from 175° to 300° C. with the preferred range being 225° to 300° C. at a pressure autogenous for the mixture of solvent and reactants being used. The optimum temperature ranges from 250° or 275° C., depending upon the reaction medium selected, to about 300° C. The time required varies with the temperature used, the lower temperatures requiring the longer times up to 12 hours at 190° C. and down to about ½ hour at 300° C., the preferred range being 1 to 2 hours at 225–300° C.

Due to the decrease in reaction time obtained by using the process of the invention, the decomposition of trifluoroethyl chloride at the reaction temperatures employed is minimized. Trifluoroethanol, in the presence of alkali salts of weak acids, such as alkali acetates, is stable under the reaction conditions employed.

The residues from the distillation of the trifluoroethanol product may be saponified to regenerate the polyhydric alcohol solvent, and this may be recycled and reused in the reaction with trifluoroethyl chloride and alkali metal salts. High yields are obtained using these recycled materials.

The invention will be further illustrated by reference to the following specific examples, in which all parts are by weight:

EXAMPLE 1

A series of preparations of trifluoroethyl alcohol was made, in which a stainless steel or lead-lined autoclave was charged with about 2 mols of ethylene glycol and various quantities of an alkali metal acetate and glacial acetic acid, as shown in the table below. This mixture was well stirred, the pH was determined by adding a sample of the mixture to several volumes of water and measuring the pH. In all preparations except Experiment 1, if the pH was greater than 7, additional acid was added. After the pH was adjusted, the autoclave was sealed and, after cooling in a Dry Ice-acetone bath, the autoclave was further charged with 0.5 mol of trifluoroethyl chloride by gaseous transfer. The autoclave was then slowly warmed to room temperature and placed in a preheated rocking heater which rapidly brought the autoclave to reaction temperature, and rocking continued at the reaction temperatures listed in the table below for the reaction times indicated.

At the end of the reaction time, the temperature was decreased to about 200° C. and the liquid was distilled from the autoclave into an ice water-cooled receiver. Volatile materials not condensed in the receiver were passed through a drying tower equipped with a Dry Ice-acetone cooled receptacle, having a bubbler attached to its outlet to indicate the rate of distillation. When the autoclave was completely vented, the contents of the first receiver were allowed to reflux under a water-cooled condenser to remove dissolved volatile components, which were then passed through the drying tower into the chilled receptacle attached thereto. All recovered trifluoroethyl chloride was found in this receptacle.

Trifluoroethanol was isolated by distillation from the first receiver. The residue from this distillation consisted of ethylene glycol and ethylene glycol diacetate which, when the diacetate is saponified, may be combined with the solid residues remaining in the autoclave to provide a polyhydric alcohol which can be used for recycling to the autoclave.

The results of these experiments are as follows:

Table 1

| Expt. No. | Reaction Conditions | | | | Autoclave [1] Metal | Reactants | | | Product Trifluoroethanol) | |
|---|---|---|---|---|---|---|---|---|---|---|
| | Time | | Temp., ° C. | Press. p. s. i. g. | | Salt Used | (Moles) | Acetic Acid, parts | Yield, Percent | Conversion, Percent |
| | Hrs. | Mins. | | | | | | | | |
| 1 | 22 | 30 | 200–225 | | Lead | Sodium acetate | 0.7 | 0 | 74.0 | 63.7 |
| 2 | 4 | | 200–230 | | do | do | 0.74 | 2 | 75.0 | 57.0 |
| 3 | 4 | | 200–230 | 900–650 | do | do | 0.74 | 2 | 76.6 | 63.0 |
| 4 | 2 | | 200–218 | 900–600 | do | do | 0.74 | 2 | 77.5 | 54.0 |
| 5 | | 30 | 200–221 | 550–900 | do | Potassium acetate | 0.74 | 2 | 82.0 | 65.0 |
| 6 | | 33 | 200–230 | 600–725 | S. S. | do | 0.74 | 2 | 85.0 | 51.7 |
| 7 | | 32 | 200–229 | 450–950 | S. S. | do | 1.12 | 4 | 88.5 | 73.5 |

[1] S. S.=stainless steel. Lead=lead liner in Monel or S. S.

EXAMPLE 2

Following a procedure similar to that described in Example 1 but employing water as the solvent instead of a glycol, and employing various buffer systems, the data shown in Table 2 were obtained.

*Table 2*

| Run No. | Temp., °C. | Pressure, p. s. i. a. | Buffer | Mol Ratio | | | Digestion (minutes) | pH of medium | | Percentage Conversion Yield (Trifluoroethanol) |
|---|---|---|---|---|---|---|---|---|---|---|
| | | | | $CF_3CH_2Cl$ | Water | Buffer | | Before | After | |
| 1 | 240-50 | 1,000 | $CH_3COOK$ / $CH_3COOH$ | 1.00 | 12.4 | 2.20 / 0.119 | 31 | | | 64.3 | 72.9 |
| 2 | 243-60 | 1,100 | $Na_2HPO_4$ / $NaH_2PO_4$ | 1.00 | 37.0 | 1.65 / 0.826 | 20 | 6.97 | 5.24 | 18.6 | 22.8 |
| 3 | 246-55 | 1,000 | $CH_3COONa$ | 1.00 | 13.2 | 2.18 | 37 | 8.59 | 6.6 | 71.2 | 81.1 |
| 4 | 248-60 | 1,000 | Na oleate | 1.00 | 18.2 | 1.35 | 67 | 9.4 | 6.0 | 45.0 | 65.3 |
| 5 | 249-65 | 1,000 | $CH_3COONa$ / $CH_3COOH$ | 1.00 | 15.7 | 2.18 / 0.264 | 60 | | 5.50 | 67.0 | 78.8 |
| 6 | 253-60 | 1,500 | $CH_3COONa$ | 1.00 | 15.7 | 2.18 | 75 | | 5.20 | 64.5 | 92.0 |
| 7 | 250-5 | 1,000 | $(CH_2COO)_2Mg$ | 1.00 | 10.6 | 2.13 / 0.98 | 66 | | 9.0 | 12.6 | 45.5 |
| 8 | 268-272 | 950 | K oleate | 1.00 | 34.0 | 2.3 | 43 | | | 64.0 | 79.2 |

EXAMPLE 3

Following the procedure of Example 1 above, another series of reactions was conducted in which the polyhydric alcohol employed, i. e., ethylene glycol, was recovered from the product mixture and recycled for use in the initial reaction. In each case 0.5 mol of trifluoroethyl chloride was employed, and in runs 1 and 3 about 2 mols glycol were charged. Recycled glycol, as shown, was the solvent in the other runs.

The results of these experiments are as follows:

EXAMPLE 4

An autoclave was charged with water and the appropriate alkali metal salt of the weak acid as shown in the résumé in Table 4. The autoclave was closed and heated to the reaction temperature with stirring. Trifluoroethyl chloride was then pumped into the autoclave from a weighed charging cylinder. The autoclave contents were then maintained at the indicated temperature for the indicated time. At the end of the reaction, vapor from the hot autoclave was vented into a chilled container. The liquid condensate was fractionated, trifluoroethyl chloride being taken off at a temperature up to about 10° C. The boiling point then rose rapidly to that of trifluoroethanol and this material was taken off at a temperature up to 80° C. The crude trifluoroethanol was purified by another distillation.

*Table 3*

REACTION OF TRIFLUOROETHYL CHLORIDE WITH ALKALI ACETATE IN ETHYLENE GLYCOL RECYCLING OF GLYCOL RESIDUE

| Expt. No. | Reaction Conditions | | | | Salt Used | (Mols) | HOAc, parts | Trifluoroethanol Yield, Percent | Comments |
|---|---|---|---|---|---|---|---|---|---|
| | Time | | Temp., °C. | Press., p. s. i. g. | | | | | |
| | Hrs. | Mins. | | | | | | | |
| 1 | | 30 | 200-222 | 750 | Potassium acetate | 0.74 | 2 | 86 | |
| 2 | | 35 | 200-226 | 600-750 | | | 2 | 83 | 90% of theoretical of KOH added to neutralize residue from Expt. 1, to provide solvent. |
| 3 | | 32 | 200-226 | 600-775 | Potassium acetate | 0.74 | 2 | 74.5 | |
| 4 | | 30 | 200-228 | 625-750 | | | 2 (+ 1 part $H_2O$) | 87.5 | 90% of theoretical of KOH added to neutralize residue from Expt. 3, to provide solvent. |
| 5 | | 30 | 200-236 | 510-600 | | | 2 (+ 1 part $H_2O$) | 91 | $CF_3CH_2OH$ removed from Expt. 4 and remainder recycled as solvent. |
| 6 | | 30 | 200-220 | 500 | | | 2 (+ 2 parts $H_2O$) | 99 | Recycle of Expt. 2 residue. |
| 7 | | 30 | 200-225 | 1,000 | | | 4 (+ 2 parts $H_2O$) | 94.5 | Residues from Expt. 7 of Table 1 used as solvent. |

*Table 4*

| Run No. | TFEC[1]:NaOAc:$H_2O$ molar ratio | Time Digestion (min.) | Temp., °C. | Pressure (p. s. i. g.) | TFEA[2] Percent Yield | TFEA[2] Percent Conv. |
|---|---|---|---|---|---|---|
| 1 | 1:2.2:3.14 | 50 | 280 | 1,275 | 84.1 | 59.1 |
| 2 | 1:2.2:4.00 | 75 | 290 | 1,360 | 83.0 | 76.1 |
| 3 | 1:2.2:8.00 | 50 | 292 | 1,465 | 85.2 | 76.8 |
| 4 | 1:2.2:12.86 | 50 | 280 | 1,500 | 82.0 | 72.9 |
| 5 | 1:1.3:10.00 | 20 | 280 | 2,525 | 81.6 | 55.5 |
| 6 | 1:1.3:30.00 | 60 | 280 | 1,700 | 80.6 | 71.6 |
| 7 | 1:3.0:10.00 | 60 | 280 | 2,250 | 79.2 | 78.0 |

[1] TFEC=trifluoroethyl chloride.
[2] TFEA=trifluoroethyl alcohol.

EXAMPLE 5

A stainless steel autoclave was charged with 2.03 mols of potassium acetate, 2.29 mols of butane-2,3-diol, 1 mol of trifluoroethyl chloride, and 0.121 mol glacial acetic acid. While agitating this mixture, it was heated to a temperature of 220 to 230° C. at a pressure up to 725 p. s. i. g. for a period of 47 minutes, at the end of which time the reaction mixture was distilled and a yield of 87.6% of trifluoroethanol was obtained.

EXAMPLE 6

A Monel metal autoclave was charged with 61 parts of sodium acetate, 87 parts of ethylene glycol and 56 parts of trifluoroethyl chloride. The reaction mixture was agitated and heated for 16.5 hours at a temperature of 210 to 225° C. Trifluoroethanol was separated from the reaction mixture by distillation in an 83 percent yield.

EXAMPLE 7

A stainless steel autoclave was charged with 199 parts of sodium caprylate, 300 parts of ethylene glycol and 100 parts of trifluoroethyl chloride. The reaction mixture was agitated and heated for 25 hours at a temperature of 200 to 210° C. Trifluoroethanol was obtained from the reaction mixture by distillation.

EXAMPLE 8

A stainless steel autoclave was charged with 144 parts of sodium benzoate, 300 parts of ethylene glycol and 95 parts of trifluoroethyl chloride. The reaction mixture was agitated and heated for 25.5 hours at a temperature of 218 to 220° C. Trifluoroethanol was isolated from the reaction mixture by distillation in a yield of 69 percent.

EXAMPLE 9

A Monel metal autoclave was charged with 28 parts of sodium carbonate, 87 parts of ethylene glycol and 59 parts of trifluoroethyl chloride. The autoclave was pressured with carbon dioxide gas to a pressure of 800 p. s. i. g. and, while the reaction mixture was agitated, it was heated for 4.25 hours at a temperature of 240 to 255° C. Trifluoroethanol was isolated from the reaction mixture by distillation in a 53 percent yield.

EXAMPLE 10

Following a procedure as described in Example 1, 57.8 parts trifluoro ethyl chloride, 92 parts glycerine, 108 parts potassium acetate, and 5 parts acetic acid were heated together in an autoclave at a temperature of 245–267° C. for 30 minutes, a pressure of 1100 pounds p. s. i. g. being autogenously produced. A yield of 29 parts of trifluoroethyl alcohol was obtained.

Example 11

Following a procedure as described in Example 1, 60 parts trifluoroethyl chloride, 88 parts normal pentanol, 100 parts potassium acetate, and 4 parts acetic acid were heated together in an autoclave at a temperature of 254–270° C. for 70 minutes. A pressure of 800 pounds p. s. i. g. was autogenously developed. Seven parts of trifluoroethyl alcohol were obtained.

EXAMPLE 12

Following a procedure as described in Example 4, trifluoroethyl chloride, sodium benzoate, and water were charged to the antoclave in the ratio of 1 mol of trifluoroethyl chloride, 1.57 mols sodium benzoate, and 24.8 mols water. The reaction mixture was carried out at a temperature of from 270–284° C. for 48 minutes. The conversion to trifluoroethyl alcohol was 73 percent and the yield 84 percent.

EXAMPLE 13

Following a procedure as described in Example 1, trifluoroethyl chloride, sodium acetate, and propylene glycol were charged to the autoclave in the proportion 2.03 mols trifluoroethyl chloride, 2.75 mols sodium acetate, and 4.1 mols propylene glycol. The reaction mixture was carried out at a temperature of 210° C. for 19 hours. A conversion to trifluoroethyl alcohol of 29.4 percent and a yield of 55 percent were obtained.

Other alcohols that may be used in procedures substantially as described in Examples 10, 11, and 13 above include n-butanol and branched chain pentanols, hexanols and the like, and higher glycols.

It will be obvious to those skilled in the art that many modifications may be made within the scope of the present invention without departing from the spirit thereof and the invention includes all such modifications.

We claim:

1. A process for the preparation of 2,2,2-trifluoroethanol that comprises heating 2,2,2-trifluoroethyl chloride to a temperature in the range of from about 175 to about 300° C. with a solvent selected from the group consisting of water and an alcohol that is reasonably stable against decomposition under the reaction conditions employed, the reaction medium being maintained for the most part at a pH between 3 and 10.

2. The process of claim 1 in which a salt of a weak acid is dissolved in the reaction medium to maintain the stated pH.

3. A process for the preparation of 2,2,2-trifluoroethanol that comprises heating 2,2,2-trifluoroethyl chloride to a temperature in the range of from about 175 to about 300° C. with a solvent selected from the group consisting of water and an alcohol that is reasonably stable against decomposition under the reaction conditions employed, having an acid and a salt of a weak acid dissolved therein, the reaction medium being maintained at a pH for the most part between 4 and 7.

4. A process for the preparation of 2,2,2-trifluoroethanol that comprises heating 2,2,2-trifluoroethyl chloride in a reaction medium that includes for each mol of the trifluoroethyl chloride at least one mol of a solvent selected from the group consisting of water and an alcohol that is reasonably stable against decomposition under the reaction conditions employed, having a salt of a weak acid dissolved therein, the reaction medium being maintained at a pH for the most part between 4 and 7 and being heated to a temperature in the range of 175° to 300° C.

5. A process for the preparation of 2,2,2-trifluoroethanol that comprises heating 2,2,2-trifluoroethyl chloride in a reaction medium that includes for each mol of the trifluoroethyl chloride at least one mol of a solvent selected from the group consisting of water and an alcohol that is reasonably stable against decomposition under the reaction conditions employed, having dissolved therein a small amount of acid and at least 1.5 mols of a salt of a weak acid, the reaction medium being maintained at a pH for the most part between 4 and 7 and being heated to a temperature in the range of 225 to 300° C.

6. The process of claim 1 in which the solvent is water.

7. The process of claim 1 in which the solvent is a glycol.

8. The process of claim 4 in which the solvent is water.

9. The process of claim 4 in which the solvent is a glycol.

10. The process of claim 5 in which the salt is a salt of the same acid as the added acid.

11. The process of claim 8 in which the salt is an alkali metal benzoate.

12. The process of claim 9 in which the salt is an alkali metal benzoate.

13. The process of claim 8 in which the salt is an alkali metal phthalate.

14. The process of claim 9 in which the salt is an alkali metal phthalate.

15. The process of claim 8 in which the salt is an alkali metal acetate.

16. The process of claim 9 in which the salt is an alkali metal acetate.

17. The process of claim 8 in which the reaction is carried out in the temperature range 250 to 300° C.

References Cited in the file of this patent

UNITED STATES PATENTS 2,666,797    Husted et al. _____ Jan. 19, 1954

FOREIGN PATENTS 863,190    Germany _____ Nov. 27, 1952

OTHER REFERENCES

Henne et al.: J. A. C. S., vol. 70, p. 1968 (1948).